United States Patent [19]

Elpern et al.

[11] Patent Number: 5,172,552
[45] Date of Patent: Dec. 22, 1992

[54] TURBOCHARGER WITH FLEXIBLE CABLE WASTEGATE OPERATING LINKAGE

[75] Inventors: David G. Elpern, Los Angeles; Glenn G. Gaba, Palmdale, both of Calif.

[73] Assignee: Allied-Signal Inc., Morristown, N.J.

[21] Appl. No.: 790,951

[22] Filed: Nov. 12, 1991

[51] Int. Cl.⁵ ............................................ F02B 37/12
[52] U.S. Cl. ....................................... 60/602; 251/294
[58] Field of Search ............... 60/600, 601, 602, 603; 251/294

[56] References Cited

U.S. PATENT DOCUMENTS

| | | | |
|---|---|---|---|
| 2,893,419 | 7/1959 | Coulter | 251/294 |
| 3,960,032 | 6/1976 | Schiff | 251/294 |
| 4,467,606 | 8/1984 | Chaffiotte | 60/602 |
| 4,528,816 | 7/1985 | Arnaud | 60/602 |
| 4,613,288 | 9/1986 | Mc Inerney | |
| 4,763,475 | 8/1988 | Toshio et al. | 60/602 |
| 4,840,079 | 6/1989 | Nilsson | |

Primary Examiner—Michael Koczo
Attorney, Agent, or Firm—Ken C. Decker; William N. Antonis

[57] ABSTRACT

An exhaust driven turbocharger includes a wastegate valve which is operated by a pneumatic actuator mounted on the outer edge of the compressor housing. A portion of the linkage interconnecting the actuator with the wastegate valve includes a flexible cable which is routed around the edge of the turbine housing, around the center housing and over the outer edge of the turbine housing to a lever which operates the wastegate. In alternate embodiment, the axis of the actuator extends substantially parallel to the axis of the turbocharger, and the flexible cable is looped around the end of the turbocharger and extends across the center housing to engage the lever actuating the wastegate valve.

13 Claims, 3 Drawing Sheets

TURBOCHARGER WITH FLEXIBLE CABLE WASTEGATE OPERATING LINKAGE

This invention relates to an exhaust gas driven turbocharger and a wastegate actuator for a turbocharger.

Exhaust gas driven turbochargers include a turbine wheel and a compressor wheel mounted on a common rotatable shaft. Exhaust gasses communicated through the turbine wheel rotate the turbine wheel, the shaft, and the compressor wheel, so that the compressor wheel compresses air to supply charge air to the vehicle engine, thereby increasing power. On many turbocharger applications, the maximum charge air available from the turbocharger will overboost the engine so that the maximum pressure delivered by the turbocharger must be limited. This is done by providing a wastegate valve in the turbine housing through which exhaust gasses are communicated to the turbine wheel. A pneumatic actuator which is operated by the discharge pressure from the compressor wheel operates the wastegate valve. The pneumatic actuator is connected to the wastegate valve in prior art turbochargers through a rigid linkage. Accordingly, the pneumatic actuator must be aligned with the wastegate valve, thereby requiring an expensive bracket, and severely increasing the package size of the turbocharger, thereby limiting the manner in which the turbocharger can be installed in the crowded engine compartment of a modern vehicle. The linkage itself is also relatively complicated and expensive. Also, the position of the actuator may make installation awkward, even if the overall size of the turbocharger is not a problem.

The present invention uses a pneumatic actuator which is mounted directly on the end of the compressor housing, instead of on the side of the compressor housing as in prior art turbochargers. The location of the actuator on the end of the compressor housing is not critical, and the actuator is connected to the wastegate valve by a flexible cable which is wrapped around or over the turbocharger housing. Accordingly, a substantially smaller package size results as compared to prior art turbochargers, and the flexible cable is considerably less expensive than the total price of the rigid linkage and bracket necessary on prior art turbochargers.

These and other advantages of the present invention will become apparent from the following description, with reference to the accompanying drawings, in which.

Figure 1:
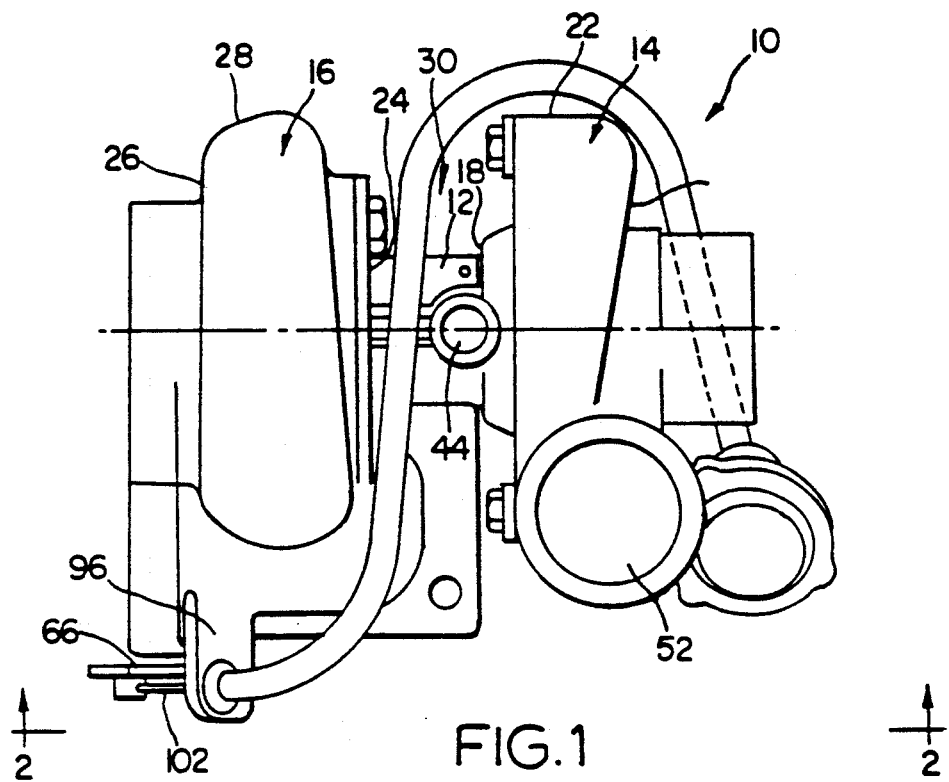
FIG. 1 is a top view of a turbocharger made pursuant to the teachings of the present invention.
Figure 2:
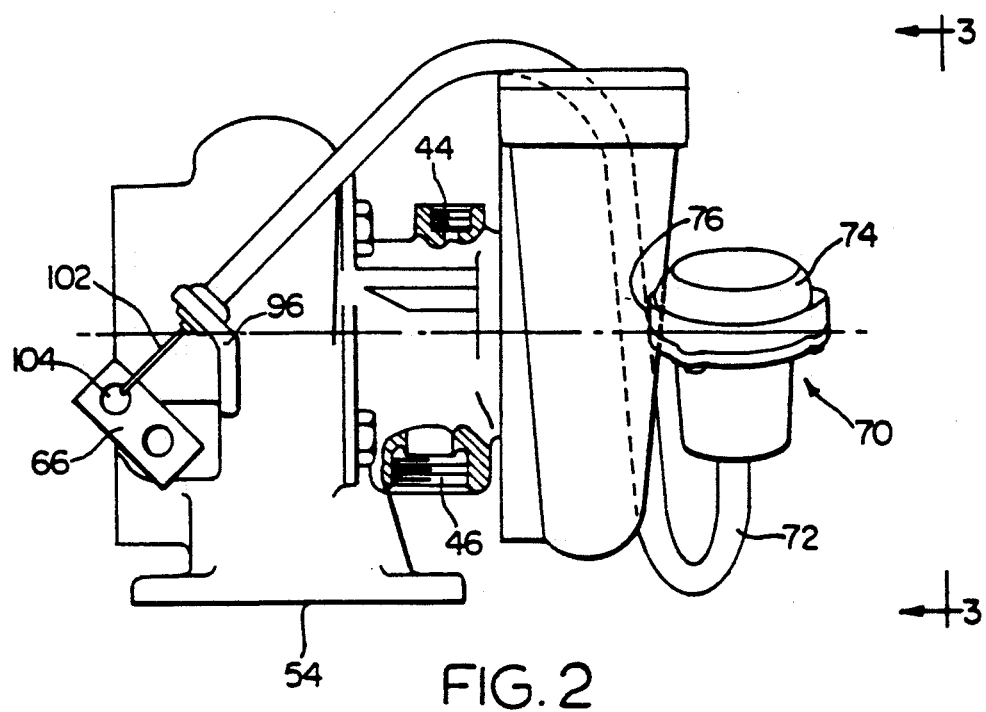
FIG. 2 is a side view of the turbocharger illustrated in FIG. 1 taken substantially along lines 2—2 of FIG. 1.
Figure 3:
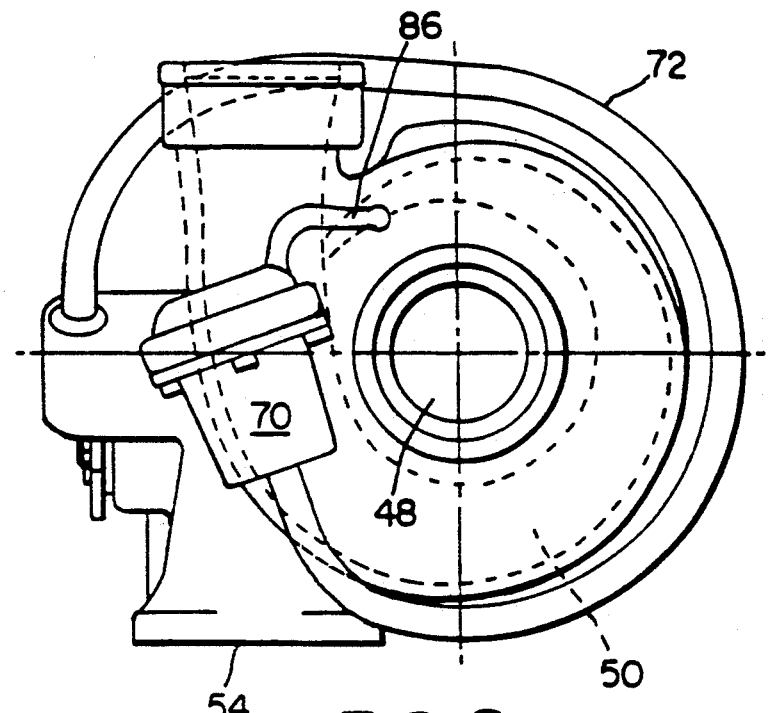
FIG. 3 is an end view of the turbocharger illustrated in FIGS. 1 and 2 taken substantially along lines 3—3 of FIG. 2.
Figure 4:
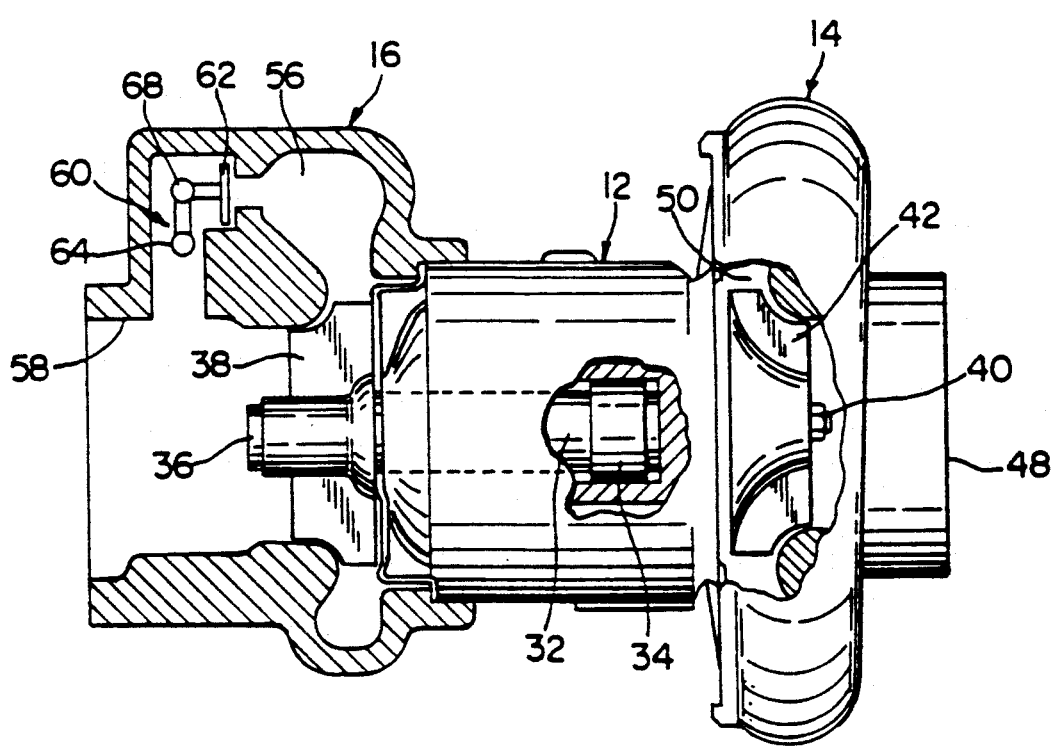
FIG. 4 is a view, partially in section, illustrating the internal components of the turbocharger illustrated in FIGS. 1-3.

Referring now to the drawings, an exhaust gas driven turbocharger generally indicated by the numeral 10 includes a center housing 12, a compressor housing 14 attached to one end of the center housing 12, and a turbine housing 16 attached to the opposite end of the center housing 12. The compressor housing 14 includes an inner edge 18 which is connected to the center housing 12, an opposite outer edge 20 and a connecting edge 22. Similarly, the turbine housing 16 includes an inner edge 24 connected to the center housing 12, an opposite outer edge 26, and a connecting edge 28 which connects the inner edge 24 with the outer edge 26. The diameter of the compressor housing 14 and turbine housing 16 are greater than that of the center housing 12, so that the housings 14 and 16 define a circumferentially extending groove 30 therebetween.

A shaft 32 is supported for rotation relative to the center housing 12 by axially spaced bearings, one of which is indicated at 34. One end 36 of the shaft 32 extends into the turbine housing 16. A conventional turbine wheel 38 is mounted on the end of the shaft 36 for rotation therewith. The other end 40 of the shaft 32 extends into the compressor housing 14. A conventional compressor wheel 42 is mounted on end 40 of the shaft 32 for rotation therewith. Lubricating oil is furnished to the bearings 34 through a port 44 and is drained from the center housing 12 through drain port 46.

Rotation of the compressor wheel 42 with the shaft 32 draws air into the housing 14 through inlet opening 48. The air is compressed as it travels through the compressor wheel 42 and is collected in circumferentially extending volute passage 50. Compressed air is discharged from the volute passage 50 through outlet opening 52, which communicates with a conduit (not shown) which communicates the compressed air back to the inlet manifold of the engine upon which the turbocharger 10 is used. Rotation of the shaft 32 is effected by passing hot exhaust gasses through the turbine wheel 38, where some of the thermal energy of the exhaust gasses is transformed into rotational energy of the shaft 36 in a manner well known to those skilled in the art. Exhaust gasses are admitted into the housing 16 through inlet opening 54 and are passed into a circumferentially extending volute passage 56. After passing through the turbine wheel 38, exhaust gasses are discharged into the vehicle exhaust system through outlet opening 58.

Because under some operating conditions the compressed air discharged through opening 52 is too high and would overboost the engine, the turbocharger 10 must be controlled to limit the maximum pressure output of compressed air. This is done by providing a bypass passage generally indicated by the numeral 60, which connects the volute passage 56 with the outlet 58, bypassing the turbine wheel 38. A wastegate valve 62 opens and closes the bypass passage 60 so that when the wastegate valve 62 is closed, all of the exhaust gasses are passed through the turbine wheel 38, but as the wastegate valve 62 is opened, an increasing percentage of the exhaust gasses are bypassed through the bypass passage 60, until when the wastegate valve 62 is fully opened, all the exhaust gasses are bypassed. The wastegate valve 62 is mounted for rotation with a shaft 64 which is rotatably mounted in the housing 16 through linkage 68. Rotation of the shaft 64 is effected by movement of a lever arm 66, which is also fixed to the shaft 64, along with the linkage 68 which carries the wastegate valve 62.

A pneumatic actuator generally indicated by the numeral 70 is provided to operate the lever 66. Pneumatic 70 is connected to the lever 66 by a flexible bowden cable generally indicated by the numeral 72, which will be described in detail hereafter. Actuator 70 (see FIG.

Figure 5:
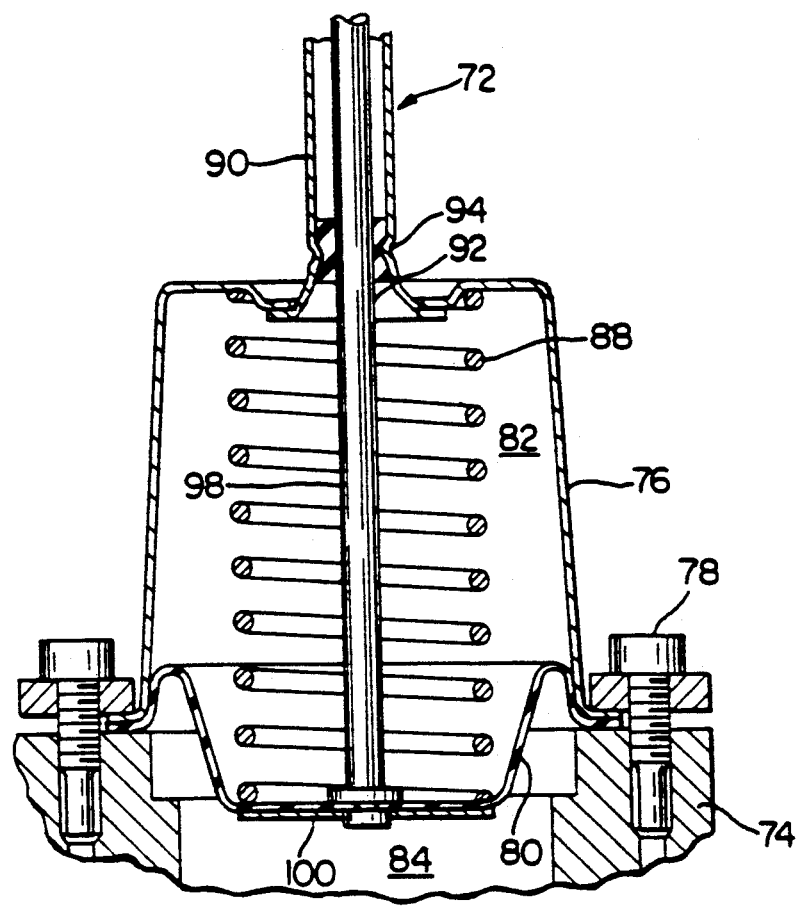
FIG. 5 is a longitudinal cross-sectional view taken through the actuator used on the turbocharger illustrated in FIGS. 1-4.

5) comprises a housing including a base portion 74 which has a mounting surface 76 that mounts and is secured directly to a corresponding mounting surface on the outer edge 20 of the compressor housing 14. The housing of the actuator 70 further includes a projecting can-shaped portion 76 which is secured to the base portion 74 by bolts 78. A diaphragm 80 divides the cavity defined within the portion 74 and 76 into an atmospheric chamber 82, which is vented to atmosphere, and a pressure chamber 84, which is communicated to the pressure level in the volute passage 50 through a flexible hose 86. The diaphragm 80 is urged downwardly viewing FIG. 5 into the base portion 74 by return spring 88.

The cable 72 comprises an outer sheath 90 which circumscribes an inner, incompressible, wire-like member 92, which is freely slidable within the sheath 90. One end of the sheath 90 is crimped to the end of the can-shaped portion 76 as at 94. The other end of the sheath 90 is secured to an angled bracket 96 which is secured to the turbine housing 16. One end 98 of the inner wire 92 projects through the can-shaped portion 76 and is riveted to a pressure plate 100, and the other end 102 of the wire-like member 92 projects from the bracket 96 and is hooked into an opening 104 in the lever arm 66.

Since opposite ends of the sheath 90 are fixed, and since the wire-like inner portion 92 is fixed for movement with the diaphragm 80, incremental movement of the diaphragm 80 will be transmitted by the wire-like member 92 into an identical incremental movement of end 102 of the wire-like member. Accordingly, rotation of the lever arm 66 through an equivalent arc will be also effected, thereby operating the wastegate valve 62. It should be noted that in conventional turbochargers, the actuator 70 would have to mounted on a bracket attached either to the center housing 12 or to the turbine housing 14, and connected to a lever arm such as lever 66 through a rigid linkage. Because the actuator must be aligned with the lever arm in prior art turbochargers because of the rigid linkage interconnecting the two, the actuator 70 had to be mounted some distance away from the housings 12 or 14 in some applications, thus requiring a relatively large and expensive bracket and also substantially increasing the envelope size of the entire assembly. In the present case, the actuator 70 can be mounted in virtually any position on the outer edge of the compressor housing, thus substantially increasing packaging flexibility. By mounting the actuator 70 on the end of the compressor housing, substantial flexibility is gained. Also, the flexible cable 72 is wrapped around the connecting edge 14 of the compressor housing, into the gap 30 between the compressor housing 14 and the turbine housing 16, around a portion of the center housing 12, and then over the connecting edge 28 to engage the lever arm 66. Accordingly, the overall width of the turbocharger using the flexible cable 72 with the actuator housing 74 mounted on the outer edge of the compressor housing 14 is substantially reduced as compared with prior art wastegated turbochargers.

Figure 6:
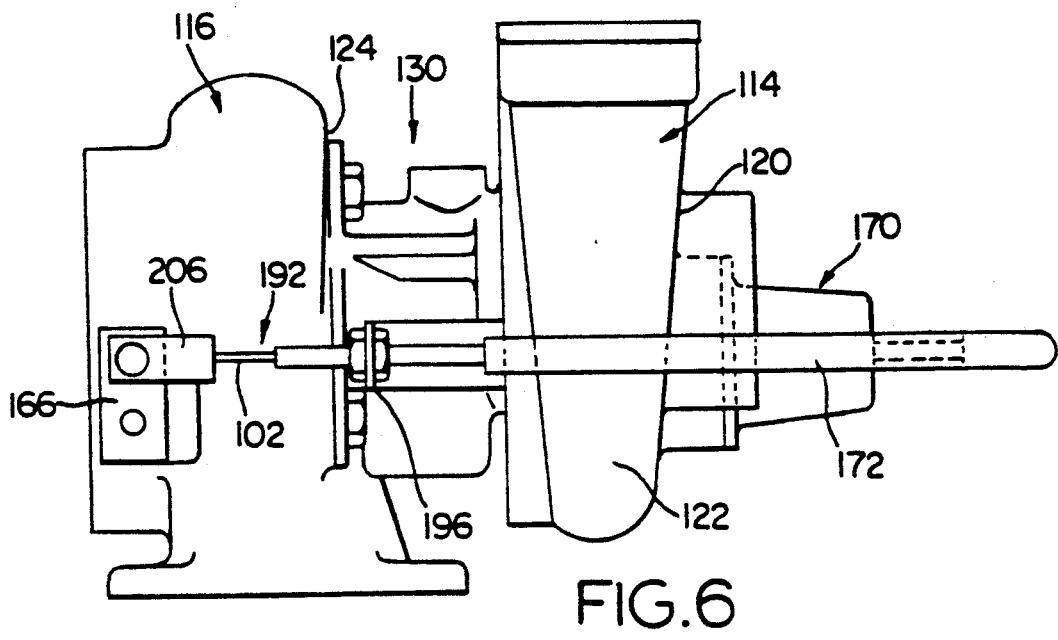
FIG. 6 is a view similar to FIG. 2 but illustrating an alternate embodiment of the invention.

Referring now to the alternate embodiment of FIG. 6, elements substantially the same as those in the preferred embodiment retain the same reference numeral, but increased by 100. It will be noted that the axis of the actuator 70 in the preferred embodiment, along which the diaphragm 80 and end 98 of the wire-like portion 92 move, extends obliquely with respect to the axis of rotation of the shaft 32. In the embodiment of FIG. 6, the axis of the actuator 172 extends substantially parallel to the axis of rotation of the shaft 32, although the actuator 172 is still mounted on the outer edge 120 of the compressor housing 114. The flexible cable 172 projects from the actuator 170 and is then looped around through a 180 degree bend and then passes in a substantially straight line over the connecting edge 122 of the turbine housing 114, across the gap 130, and is secured to the bracket 196 secured to the inner edge 124 of the turbine housing 116. A portion of the sheath 90 extends past the bracket 196, but the bracket 196 attaches substantially to the end of the sheath. The end 102 of the wire-like portion 192 is attached to a fixture 206

We claim:

1. Turbocharger comprising a compressor housing, a turbine housing, and a center housing between the compressor housing and the turbine housing, a shaft rotatably supported in the center housing, one end of said shaft extending into the turbine housing, the other end of the shaft extending into the compressor housing, a turbine wheel mounted on said one end of the shaft, a compressor wheel mounted on the other end of the shaft, said turbine housing defining a turbine volute passage for communicating exhaust gasses to the turbine wheel, said compressor housing defining a compressor volute passage for communicating compressed air delivered by said compressor wheel to an outlet, a lever actuated wastegate valve operable to vent said turbine passage, a pneumatic actuator communicated with said compressor volute passage for operating said lever when the pressure level in the compressor volute passage attains a predetermined level, and a flexible cable interconnecting the pneumatic actuator and said lever.

2. Turbocharger as claimed in claim 1, wherein said cable includes an outer sheath and an incompressible member slidable within said sheath connected to said actuator and to said lever for transmitting movement of the actuator to the lever.

3. Turbocharger as claimed in claim 2, wherein said sheath includes a pair of opposite end portions, and means for fixing each end portion of the sheath relative to said housings.

4. Turbocharger as claimed in claim 2, wherein said actuator includes an actuator housing and a pressure operated diaphragm within the actuator housing, one end portion of the sheath being secured to the actuator housing, the corresponding end of the incompressible member extending into said actuator housing and being secured to said diaphragm.

5. Turbocharger as claimed in claim 4, wherein the other end portion of said sheath is secured to a bracket fixed to one of said center, turbine and compressor housings.

6. Turbocharger as claimed in claim 4, wherein a mounting surface is defined on said compressor housing, and said actuator housing includes a corresponding mounting surface engaging the mounting surface on the compressor housing.

7. Turbocharger as claimed in claim 2, wherein each of said compressor and turbine housings include an inner edge connected to the center housing, an opposite outer edge, and a connecting edge connecting the inner and outer edge, said actuator being mounted on the outer edge of the compressor housing and said lever being mounted on the outer edge of the turbine housing, said cable wrapping around said housings to connect the actuator with the lever.

8. Turbocharger as claimed in claim 7, wherein said cable is wrapped around the connecting edge of the compressor housing, extends between the compressor and turbine housings as it wraps around a portion of the center housing, and then wraps around the connecting edge of the turbine housing to attach to said lever.

9. Turbocharger as claimed in claim 7, wherein said actuator has an axis, said diaphragm being movable along said axis in response to pressure from said compressor housing, said axis of the actuator extending obliquely with respect to said shaft.

10. Turbocharger as claimed in claim 7, wherein said actuator has an axis, said diaphragm being movable along said axis in response to pressure from said compressor housing, said axis of the actuator extending substantially parallel with respect to said shaft.

11. Turbocharger as claimed in claim 7, wherein said actuator includes an actuator housing and a pressure operated diaphragm within the actuator housing, one end portion of the sheath being secured to the actuator housing, the corresponding end of the incompressible member extending into said actuator housing and being secured to said diaphragm.

12. Turbocharger as claimed in claim 11, wherein the other end portion of said sheath is secured to a bracket fixed to one of said center, turbine or compressor housings.

13. Turbocharger as claimed in claim 11, wherein a mounting surface is defined on said compressor housing, and said actuator housing includes a corresponding mounting surface engaging the mounting surface on the compressor housing.

* * * * *